W. R. FASEY, G. T. GALLEY & G. TUFNELL.
MECHANISM FOR CONVERTING RECIPROCATORY INTO ROTARY MOTION.
APPLICATION FILED APR. 7, 1915.
1,261,111. Patented Apr. 2, 1918.
6 SHEETS—SHEET 1.
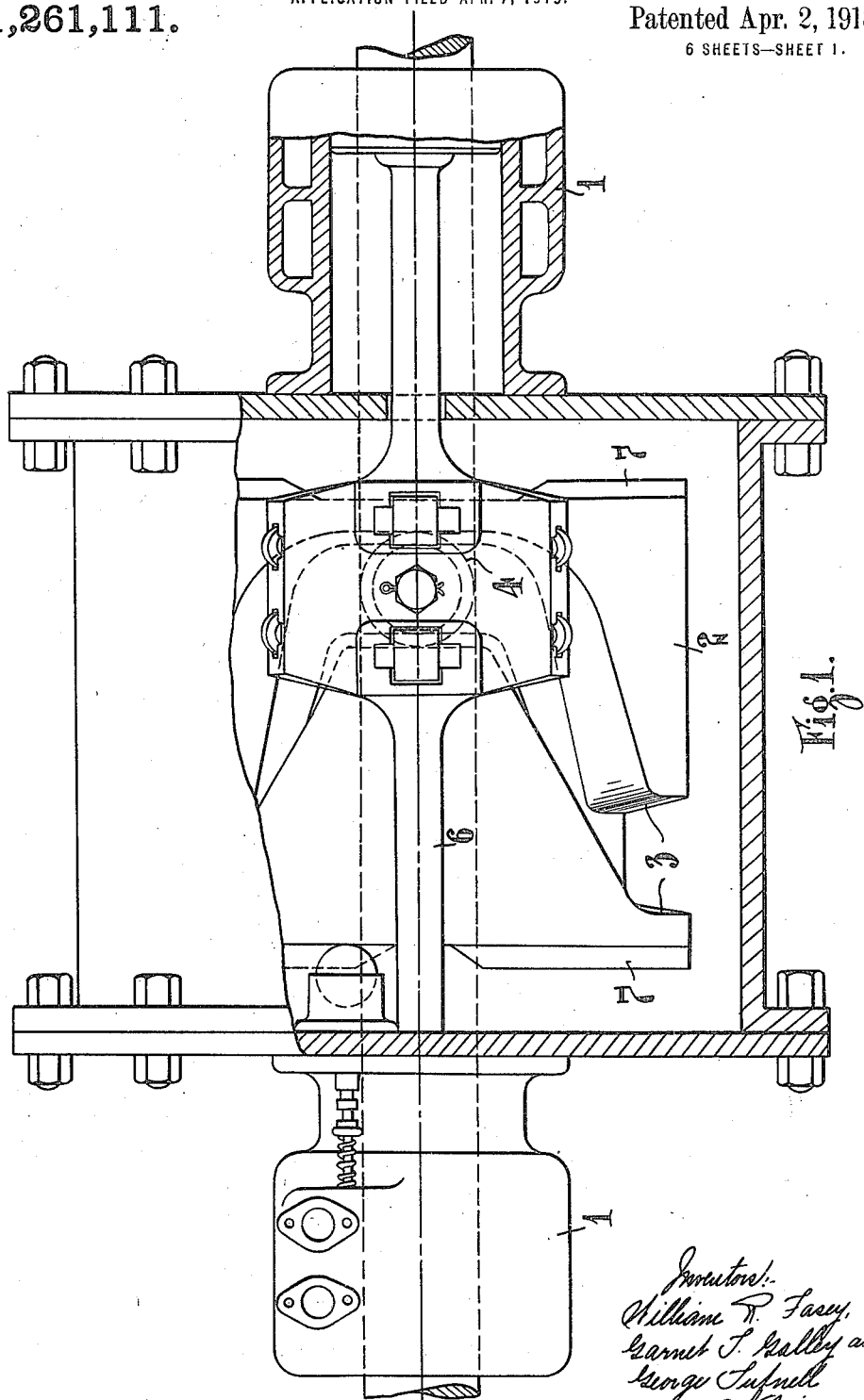

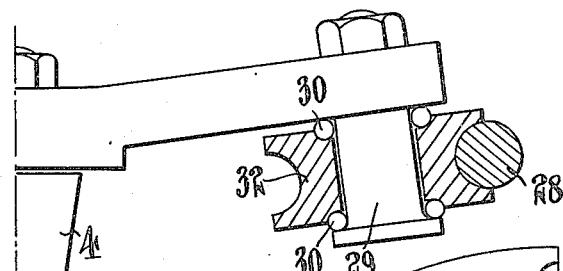
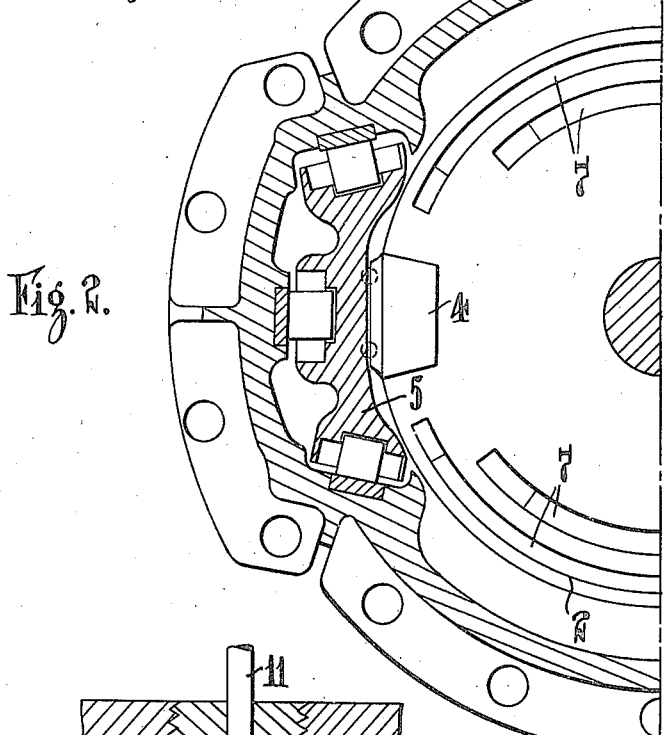
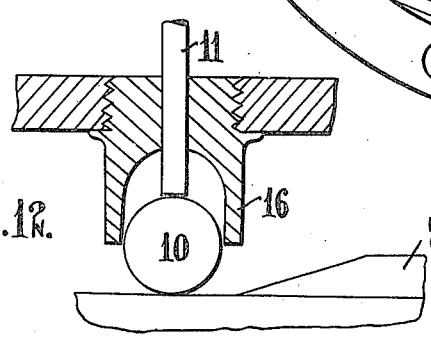

W. R. FASEY, G. T. GALLEY & G. TUFNELL.
MECHANISM FOR CONVERTING RECIPROCATORY INTO ROTARY MOTION.
APPLICATION FILED APR. 7, 1915.

1,261,111. Patented Apr. 2, 1918.
6 SHEETS—SHEET 4.

W. R. FASEY, G. T. GALLEY & G. TUFNELL.
MECHANISM FOR CONVERTING RECIPROCATORY INTO ROTARY MOTION.
APPLICATION FILED APR. 7, 1915.

1,261,111.

Patented Apr. 2, 1918.
6 SHEETS—SHEET 5.

UNITED STATES PATENT OFFICE.

WILLIAM ROBERT FASEY, GARNET THOMAS GALLEY, AND GEORGE TUFNELL, OF LONDON, ENGLAND.

MECHANISM FOR CONVERTING RECIPROCATORY INTO ROTARY MOTION.

1,261,111.      Specification of Letters Patent.      Patented Apr. 2, 1918.

Application filed April 7, 1915. Serial No. 19,757.

*To all whom it may concern:*

Be it known that we, WILLIAM ROBERT FASEY, GARNET THOMAS GALLEY, and GEORGE TUFNELL, all subjects of the King of Great Britain, and residents of London, England, have invented certain new and useful Improvements in Mechanism for Converting Reciprocatory Into Rotary Motion, of which the following is a specification.

The invention relates to improvements in mechanism for converting reciprocatory into rotary motion. The invention is applied in the present instance by way of example to internal combustion engines, where the reciprocation of the pistons is converted into a rotary motion by the agency of a rotor having a cam path formed therein, into which cam path rollers, carried by the cross heads, extend. The rotor is adapted to actuate the valves of the engine.

An important object of our invention is to provide an engine of this character wherein the time periods of the functions of the cycle can be of different lengths irrespective of the valve timing. One particular advantage accruing from this arrangement is that the exhaust period can be made longer and the exhaust operation of the piston more gradual.

Another object of our invention is to provide all the valve and valve operating gear in the same line as the rotor, and a still further object is to eliminate or reduce friction in the sliding and abrading parts and to insure efficient operation.

Other objects and advantages will hereafter appear.

In order that our invention may be more readily understood and carried into practice, reference is hereby made to the accompanying drawings wherein Figure 1 is an elevational view of the preferred form of engine constructed in accordance with our invention and having cylinders arranged upon both sides of the rotor.

Fig. 2 is a half view of a cross section of Fig. 1.

Fig. 11 is a similar view of a modified arrangement for use where guide rods are employed, and Fig. 12 is a detatil view of the preferred form of device for actuating the valves.

Figure 4:
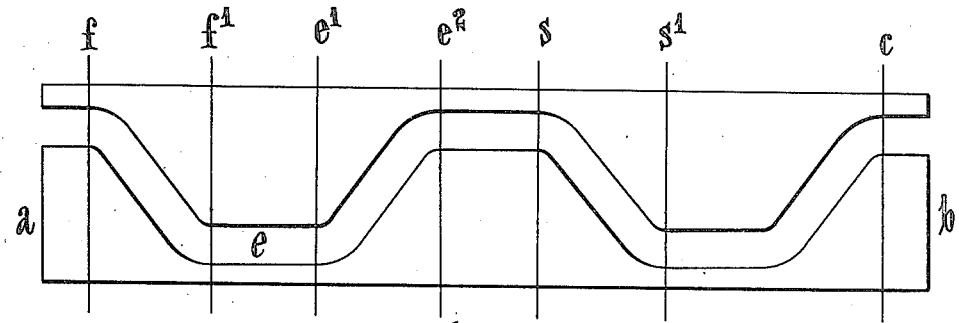
Fig. 4 is a view showing the development of the curvature of the cam path employed in the engine illustrated in Fig. 1.

Referring to these drawings and particularly to Figs. 1, 2 and 4, the numeral 1 designates the engine cylinders arranged on both sides of the rotor 2, which is provided with a cam path 3 in which rollers 4 or other devices carried by the cross-head 5 associated with the piston rod 6 coöperate to transform reciprocating motion of the piston into rotary motion in a manner which will be readily understood by those conversant with this general type of apparatus. The rotor 2 is provided upon its faces with valve actuating cams 7. These valve cams coöperate with the balls 10 which transmit motion through the rods 11 as will be clearly understood upon reference to Fig. 12.

The operation of the engine and the particular cycle upon which it works will be best understood upon reference to Fig. 4 of the drawings, which shows the curve of the cam path of the rotor laid out flat and it will be understood that the end *a* meets and joins the end *b*. The position indicated by the line *f* represents the position at which the power stroke of a piston is first applied to the cam path, and the line $f^1$ indicates the position at which the power stroke finishes. By the time the piston has reached the end of its power stroke the rotor will have turned so that the piston rod will be in line with the line $f^1$. The rotor will of course continue its rotation and during the travel of the cam path relative to the piston along the straight path $e$ of the cam there will be no movement of the piston in its cylinder. The valve cam will now operate to open the exhaust valve, and this cam can be so located that it opens the exhaust valve at any desired point while the roller 4 associated with the piston is on the straight part $e$ of the cam path. It is preferably opened immediately the roller 4 has entered this straight part $e$ of the cam and during the period when the roller is in this straight part $e$ of the cam exhaust will be taking place and the pressure within the engine cylinder will probably be reduced to atmospheric pressure by the time the roller 4 is in line with the line $e^1$. At this point the piston will begin its return or exhaust stroke, and will expel any gases remaining in the cylinder by the time the rotor has moved sufficiently to bring the roller 4 in line with the line $e^2$. The exhaust valve will now close and the inlet valve can be opened by means of the valve cam and if there is any pressure at all upon the fuel supply or any other influence tending to cause the fuel to flow, the charge will at once commence to enter the cylinder. When the line $s$ upon the cam path reaches the roller 4 on the piston, the inlet valve or port will be preferably fully open, the suction stroke will commence and will continue during the period the part of the cam path between the lines $s$ and $s^1$ is passing the roller 4. The inlet valve will now close and the further movement of the cam relative to the roller 4—that is the movement from the line $s^1$ to the line $c$—will be occupied by compression and the compressed charge will be fired when the position $f$ is again reached. Of course the compression stroke occurs when the roller 4 is traversing the inclined part of the cam path or track.

It should be noted that the parts of the track designated as "straight" need not be absolutely straight and in some cases it may be desirable to give the substantially straight parts of the track a slight curve.

The foregoing cycle of operations is described in respect of one cylinder and it will be appreciated that the same cycle must be followed in respect of all the cylinders on one side of the rotor. Upon the other side of the rotor the cylinders go through the same cycle but the cylinders are in opposite phase so that when a piston upon one side of the rotor is upon its power stroke, its opposite cylinders is exhausting or compressing and while the one is on its suction stroke the opposite one is compressing or exhausting, and the cylinders are preferably so arranged that while one pair of opposed cylinders are upon power and exhaust strokes, another pair are upon suction and compression. Thus there are practically continuous power impulses imparted to the rotor. It will be understood that the complete cam curvature shown in Fig. 4 can be repeated as many complete times as is desired around the rotor, and each complete curvature will insure a complete cycle of operations. If one complete curvature is employed, each cylinder will perform one cycle of operations during each revolution of the rotor and of course the driving shaft upon which the rotor is keyed or otherwise fixed.

Figure 7:
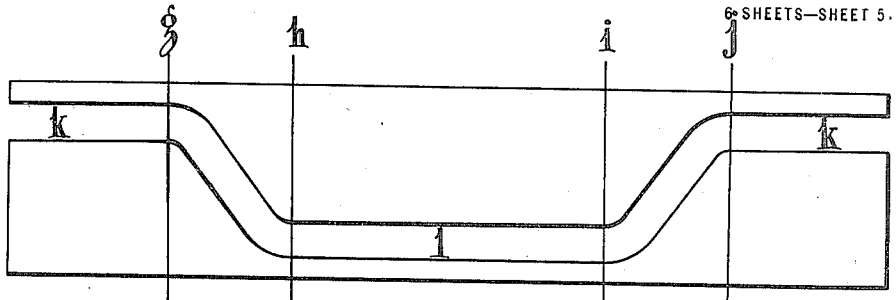
Fig. 7 is the development of a cam path where the period of the cycle of the engine exceeds one revolution of the rotor.
Figure 8:
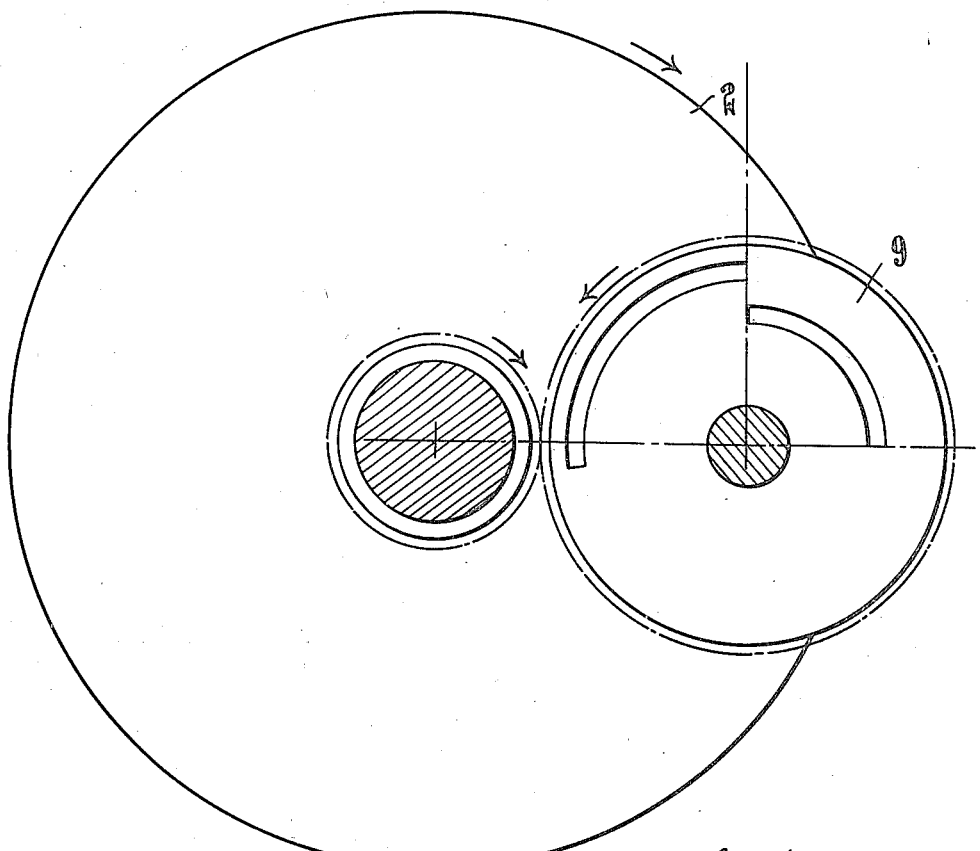
Fig. 8 is a diagrammatic view illustrating the valve controlling arrangements in such a case.

If it is desired to have less than one power stroke for each cylinder per revolution, this can be accomplished by making the cam path or equivalent such that it requires more than one revolution of the rotor to cause the occurrence of the cycle. This is best explained by considering the example where it is desired to have only one power stroke for each cylinder during two revolutions of the rotor. In such a case the cam path on the rotor would consist of a curve such as is illustrated in Fig. 7. It will be noticed that two revolutions of the rotor would give the whole of the path illustrated in Fig. 4, for if $g$—$h$ is the firing stroke and $i$—$j$ the exhaust stroke, it is obvious that they will follow as suction and compression strokes respectively. It will be noticed that while the roller 4 is in the straight part $k$ of the cam path upon one of the revolutions this straight part will correspond with part of the induction period, and during the next revolution it will correspond with part of the compression period although the effective compression stroke will be finished before the roller enters the straight part $k$, and the compression will be held during the passage of the roller 4 along this straight part until the firing position is again reached. Similarly during the passage of the roller 4 along the part $l$, if the exhaust valve is opened, exhaust by expansion will be taking place and the exhaust or compression stroke of the piston will as aforesaid occur while the roller 4 is passing the part $i$ of the cam. It will be understood that seeing that the valves must remain closed during certain revolutions of the rotor, the valve operating cams will be carried upon a part separate from the rotor and be geared in proper ratio according to the cam path. In the present example the valve cam movement will be reduced by a two or one gear. This valve operating arrangement is illustrated diagrammatically in Fig. 8. It will be seen that the member 9 carrying the valve cams rotates once to every two revolutions of the cam path and the valve cams are so located that the valves remain closed during the firing and compression periods of the cycle. It will be clear that if desirable gearing of the valves as indicated in Fig. 8 can also be utilized to give a greater number of revolutions of the rotor instead of a lesser number.

Figure 3:
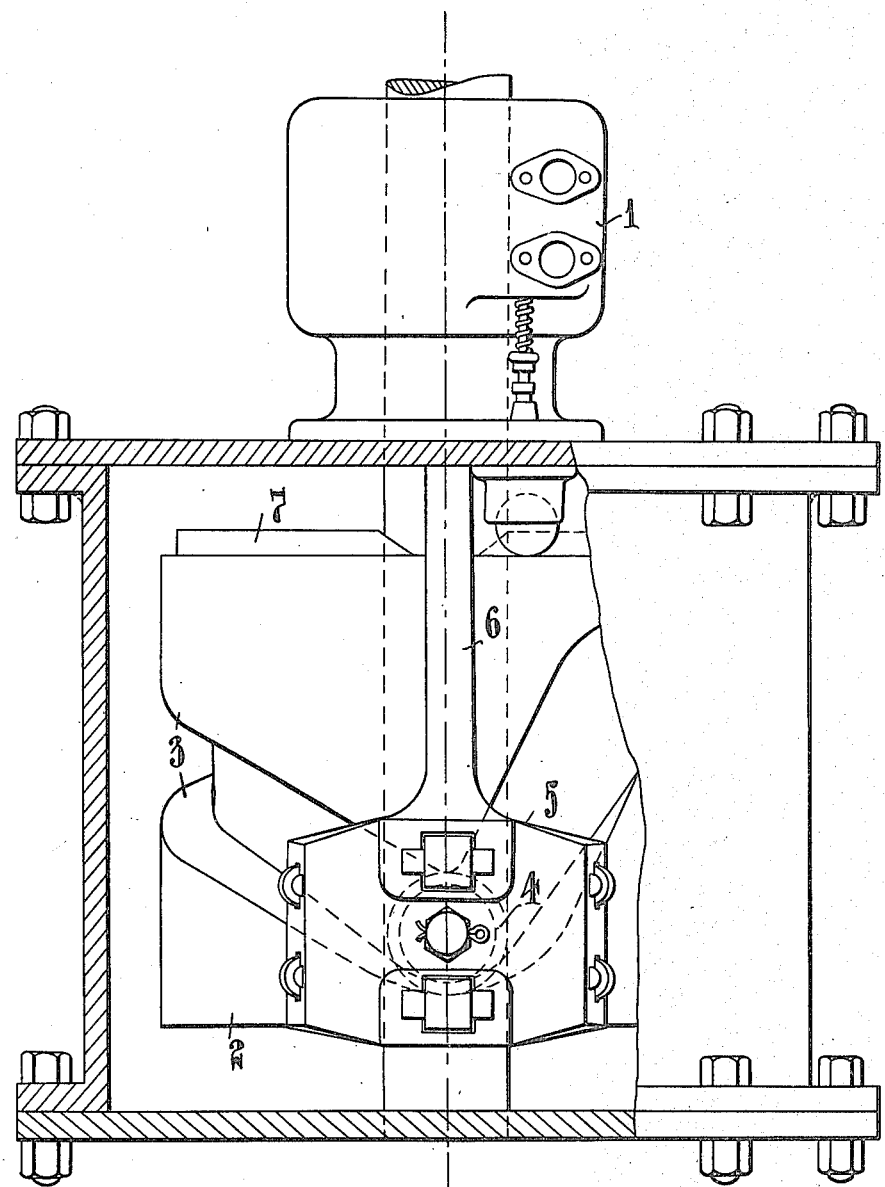
Fig. 3 is a diagram of an engine with a modified form of track where the cylinders are arranged only upon one side of the rotor.
Figure 5:
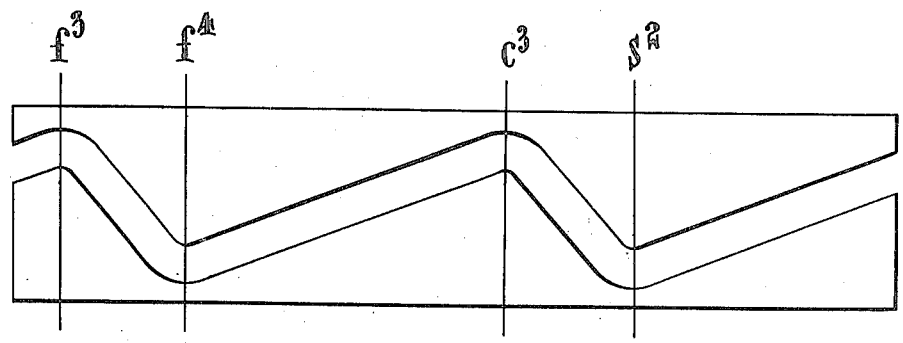
Fig. 5 is a development of the curvature of the cam path employed in the engine illustrated diagrammatically in Fig. 3.
Figure 6:
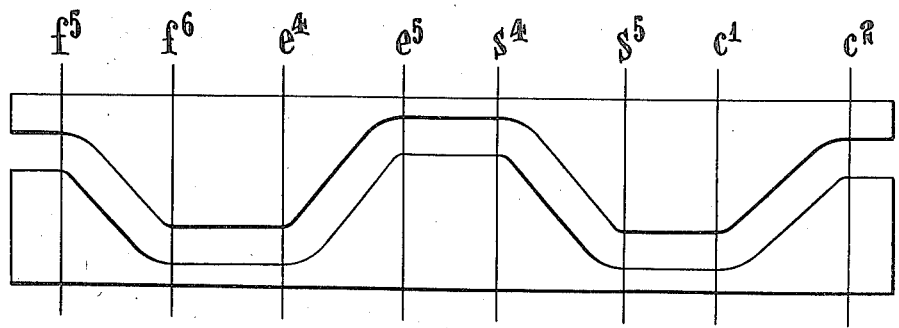
Fig. 6 is the development of a cam path where the piston movements are variable.

Figs. 3 and 5 illustrate a form of cam path which can be employed when cylinders are required only upon one side of the rotor. With this curvature the power stroke takes place between the lines $f^3$ and $f^4$, exhaust takes place from $f^4$ to $c^3$, suction from $c^3$ to $s^2$ and compression from $s^2$ to $f^3$ when the power stroke is again reached. It will be noticed that with this curvature there are the same rapid piston movements during the power and suction strokes and more gradual movements during exhaust and compression, but unlike the previous example, there are no periods where the piston remains stationary. It will be appreciated that by means of cam paths of the foregoing character, any desired periods can be provided and by adjusting the valve operating cams and the ignition timing, these periods can be finitely varied and adjusted from time to time in order to establish the best working conditions in any particular circumstances. In Fig. 6 we have shown a curvature whereby an engine with cylinders on one side of the rotor could be provided with a variable piston movement. For instance, there would be a short power stroke along the part of the path designated $f^5$—$f^6$, a longer exhaust stroke from $e^4$—$e^5$ a long suction stroke from $s^4$—$s^5$ and a short compression stroke from $c^1$ to $c^2$.

The invention has been described for convenience in relation to internal combustion engines of the "Otto" or "four cycle" type, but it can be applied to internal combustion engines of the "two cycle" type if desired and moreover can be applied with equal facility to steam or other engines.

In dealing with two cycle engines a cam path such as is illustrated in Fig. 7 could be employed but of course the curvature can be repeated as many times as desirable around the rotor.

The important consideration is that in a two cycle engine the firing stroke would occur as before while the roller 4 is traversing the part $g$—$h$ but while the roller is traversing the straight part $l$ exhaust, scavenging and injection of the charge will preferably take place, compression then occurs while the roller 4 is passing from $i$ to $j$ and the compression charge is held and carried while the roller 4 is traversing the straight part $k$ until the firing position $g$ is again reached.

Figure 9:
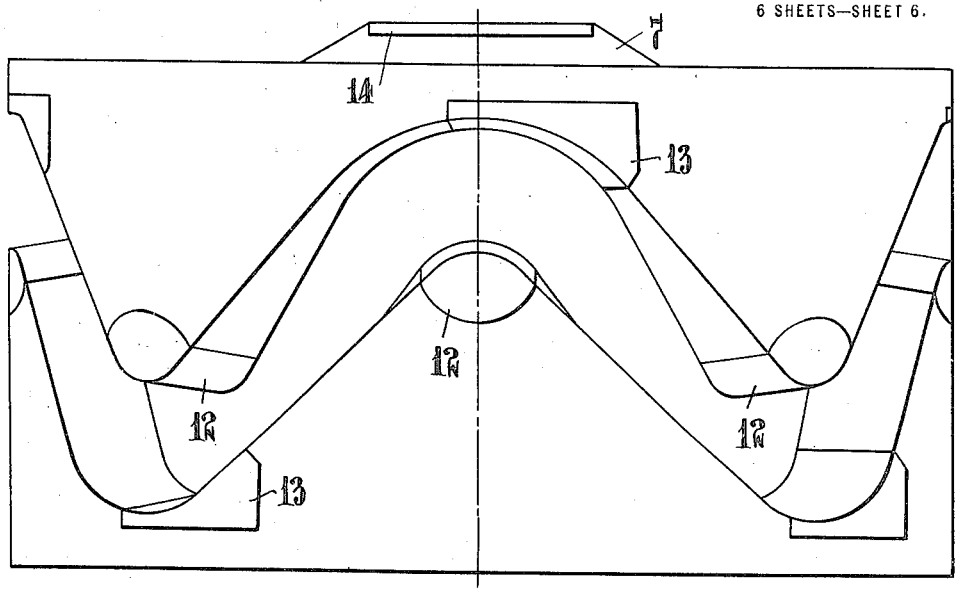
Fig. 9 is a view of a rotor formed with an evenly corrugated cam path which may in some cases be employed and this view also shows how various parts of the cam path can be provided with fitting pieces.

It is of great practical importance to obviate wear upon the cam path as much as possible, and to this end we may construct the cam path with hardened surfaces at those parts where the pistons change their direction of motion, which are the parts where wear is most liable to occur. The method we propose to employ is illustrated in Fig. 9 and consists in providing removable fitting pieces such as 12 and 13 at these points, which fitting pieces can be secured in position in any suitable way. It will be appreciated that only a few forms of fitting pieces will be required and these can be kept in stock so as to be ready for use when required. The other parts of the cam path may if required be lined with vulcanized fiber or some such material for the purpose of eliminating noise as much as possible. With this same object in view we propose to provide fitments 14 of vulcanized fiber upon the valve operating cams 7. Another detail of considerable importance is the provision of balls 10 for coöperating between the valve rods 11 and the cams 7, instead of rollers. The arrangement of these valve operating balls will be clearly understood upon reference to Fig. 12 of the drawings. The valve rods 11 pass at their actuation ends each into a cylinder 16 and a ball 10 is loosely guided to this cylinder and coöperates with the valve actuating cams 7. It will be seen that the ball reciprocates in the cylinder 16 after the fashion of a piston and imparts the required motion to the valve rod.

Another important detail of our invention consists in the particular construction and arrangement of the rollers which coöperate with the cam groove. These rollers are carried by a cross-head and the arrangement of the cross-head guides relative to the rollers is of great importance. In the first place, it is necessary to provide means for insuring that the rollers will tend to roll along the cam groove in the rotor and will be held up to their work, and it is also important that the forces transmitted to the cross-head should be transmitted in a direct line.

Figure 10:
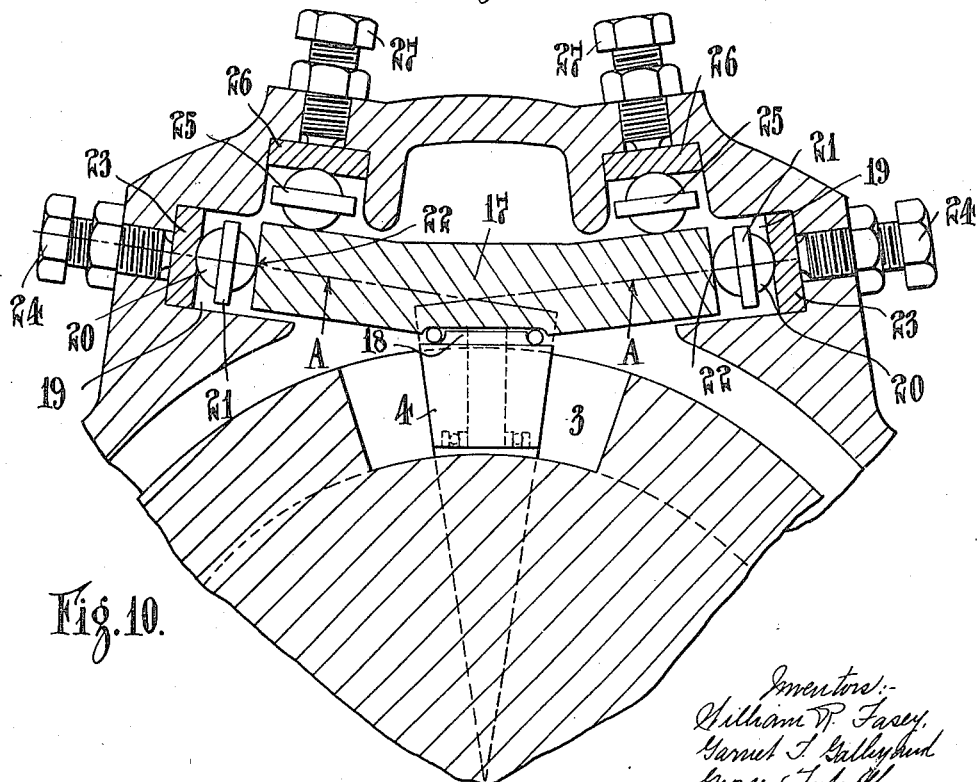
Fig. 10 is a sectional view illustrating an advantageous arrangement of cross-head.

These objects are accomplished in the following manner:—The rollers 4 are of conical formation, the lines defining their peripheries radiating from the axis of the rotor 2. The cam path or groove 3 of the rotor is, of course, cut to conform to the conical shape of the rollers. The rollers are carried by the cross-heads 17 and the rear shoulders 18 of the rollers form part of a ball race so that there is, in effect, a ball thrust bearing interposed between the rear of each of the rollers and its cross-head. Now the cross-heads run in guides 19 and these guides bear a definite relation to the rollers. That is to say, they are arranged upon a line at right angles to the lines defining the peripheries of the rollers. This will be best understood upon reference to Fig. 10 of the drawings where it will be seen that the dotted lines A at right angles to the lines defining the roller peripheries pass through the center line of the cross-head guides. Ball or roller bearings may be interposed between the cross-heads and the guides, and one arrangement is to provide rows of balls 20 side by side in cages 21 and allow sufficient clearance in the guides to permit the balls and cage to run backward and forward in the guides as shown particularly in Fig. 10. The edges of the cross-heads will be provided with races 22 upon one side of the balls and upon the other sides races will be provided cut in fitting strips 23 which by means of set-screws 24 can be adjusted for wear. A similar arrangement of ball or roller bearings 25 and fitting strips 26 may be provided at the back of the cross-heads, and set-screws 27 may be similarly provided to provide convenient means of adjusting the rollers up to their work, or removable fitting strips or liners may be provided for this purpose. Another arrangement of cross-head which may be adopted is shown in Fig. 11. In this case the cross-head guides take the form of rails 28, and the rollers 32 are mounted upon removable pins 29, and ball thrust bearings 30 are arranged upon each end of the roller. In the drawings the roller is shown as constructed to run upon a rail 28 but of course the rollers can run in guides as in Fig. 10 if desirable.

What we claim and desire to secure by Letters Patent is:—

1. A device for changing reciprocatory into rotary motion, comprising a rotor having a cam path formed therein, and rollers arranged in said cam path and mounted to reciprocate, said cam path consisting of comparatively short, steep portions connected to longer portions, whereby the reciprocating strokes of the rollers are performed in unequal time periods calculated in degrees of a revolution of the rotor.

2. Means for changing reciprocatory into rotary motion, comprising a rotor having a cam path formed therein, a cross head mounted to reciprocate, rollers carried by said cross head and arranged in said cam path and adapted to be reciprocated, said cam path consisting of comparatively short, steep portions connected to longer portions, whereby the time periods of the functions of the cycle are of different length.

3. Means for changing reciprocatory into rotary motion, comprising a rotor having a cam path formed therein, a cross head mounted to reciprocate, rollers carried by said cross head and arranged in said cam path and adapted to be reciprocated, said cam path being symmetrical and consisting of sloping parts connected together by straight parts, whereby the time periods of the functions of the cycle are of different length.

4. A mechanical movement comprising a rotor having a cam path formed therein, cross heads mounted to reciprocate, rollers carried by said cross heads and extending into said cam path, said cross heads and rollers being formed with ball races and guides for said cross heads, said cam path being symmetrical and consisting of sloping parts connected together by straight parts, substantially as described.

5. A mechanical movement comprising a rotor having a cam path formed therein, an element extending into said cam path and mounted to reciprocate, said cam path being symmetrical and consisting of sloping parts connected together by straight parts, whereby the time periods of the functions of the cycle are of different length.

6. A mechanical movement comprising a rotor having a cam path formed therein, a cross head mounted to reciprocate, rollers carried by said cross head and extending into said cam path, and cross head guides in a line at right angles to the lines defining the peripheries of the rollers, said cam path being symmetrical and consisting of sloping parts connected together by straight parts, whereby the time periods of the functions of the cycle are of different length.

7. For use in a device of the character described, a rotor having a cam path formed therein, cross heads mounted to reciprocate, rollers connected to said cross heads and extending into said cam path, cross head guides in a line at right angles to the lines defining the peripheries of said rollers, and anti-friction devices between said cross head and said cross head guide, said cam path being symmetrical and consisting of sloping parts connected together by straight parts, whereby the time periods of the functions of the cycle are of different length.

8. A mechanical movement comprising a rotor having a cam path formed therein, cross heads mounted to reciprocate and carrying rollers to coöperate with said cam path, and anti-friction devices at the faces of the cross heads remote from said rollers, said cam path being symmetrical and consisting of sloping parts connected together by straight parts, whereby the time periods of the functions of the cycle are of different length.

9. A mechanical movement comprising a rotor having a cam path formed therein, said cam path being symmetrical and consisting of sloping parts connected together by straight parts, cross heads mounted to reciprocate and carrying rollers to coöperate with said cam path, anti-friction devices at the faces of said cross heads remote from said rollers, and adjustable fitting strips against which the anti-friction devices operate.

10. For use in a device of the character described, a rotor having a cam path formed therein, said cam path being symmetrical and consisting of sloping parts connected together by straight parts, hardened fitting pieces forming parts of the cam surface, rollers coöperating with said cam path, and cross heads mounted to reciprocate and carrying said rollers, substantially as described.

In testimony whereof we affix our signatures in presence of two witnesses.

WILLIAM ROBERT FASEY.
GARNET THOMAS GALLEY.
GEORGE TUFNELL.

Witnesses:
A. W. THORNTON,
O. J. WORTH.